(No Model.)
J. G. TITUS.
AXLE BOX.
No. 245,583.  Patented Aug. 9, 1881.
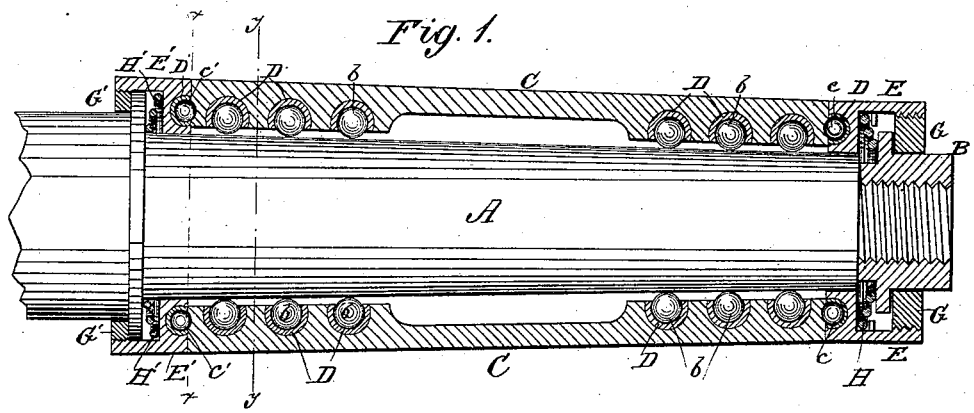
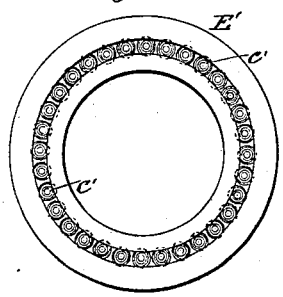
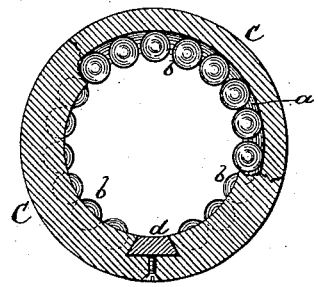
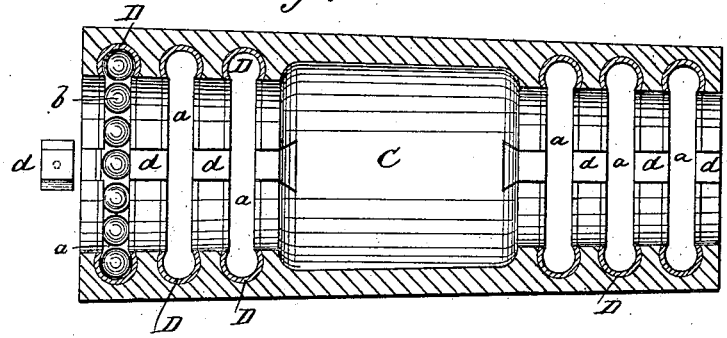
WITNESSES:
W. W. Hollingsworth
J. Kemon
INVENTOR:
J. G. Titus
BY
ATTORNEYS.

United States Patent Office.

JACOB G. TITUS, OF SILVER CLIFF, COLORADO.

AXLE-BOX.

SPECIFICATION forming part of Letters Patent No. 245,583, dated August 9, 1881.

Application filed January 3, 1881. (No model.)

*To all whom it may concern:*

Be it known that I, JACOB G. TITUS, of Silver Cliff, in the county of Custer and State of Colorado, have invented a new and Improved Anti-Friction Journal-Box; and I do hereby declare that the following is a full, clear, and exact description of the same.

My invention relates to an improvement in that class of journal-bearings in which friction is relieved by use of balls or rollers interposed between the journal and its box or casing.

My improvement consists in the construction of an axle-journal box which adapts it to receive the balls, and also in the provision of elastic and anti-friction end bearings for receiving the endwise movement or thrust of the axle-journal, as hereinafter described.

In accompanying drawings, forming part of this specification, Figure 1 is a longitudinal section of the journal-bearing, the journal itself being shown in full lines. Fig. 2 is a cross-sectional view of the journal-box on line $x\,x$, Fig. 1, showing a face view of the inner end bearing of the same. Fig. 3 is a section, with part broken out, on line $y\,y$, Fig. 1. Fig. 4 is a longitudinal section (in a horizontal plane) of the body of the journal-box.

The axle-journal A may have the usual construction, and on its reduced and threaded outer end is screwed the nut B. The journal-box C has two or more interior and parallel grooves, $a$, at each end, and in these grooves are placed balls $b$, made of steel or any other hard material suitable for the purpose. There are thus several circular parallel rows of balls to form the bearing or points of contact and wear between the journal A and box C; and since the balls are free to rotate in their respective grooves and around the journal, the friction is reduced to a minimum. The balls are placed and confined in their circular cast-steel tubes D, and the box proper, C, is cast around the tubes. The tubes D are slotted lengthwise on the inner side, and the slots are narrow enough to prevent the balls dropping out, yet sufficiently wide to allow projection of the balls, as shown, so that they will bear on the axle-journal. Various methods of placing the balls in the tubes may be employed. I illustrate one in Figs. 3, 4, wherein $d$ indicates detachable dovetailed blocks, that fit in corresponding grooves cut across the tubes D and across the ribs or parts of box C that intervene between the tubes. The blocks $d$ are placed in proper position in the grooves after the balls have been inserted, and are secured by screws.

To receive the end-thrust of the axle and to relieve friction of the journal with the nut and collar, I employ the following-described means, which are adapted to form both anti-frictional and elastic contact-surfaces.

The letter E indicates a circular ring having a groove in its inner side, in which groove steel balls $c$ are placed. This ring E is screw-threaded internally at its outer end to adapt it to receive the annular nut G, which fits closely around the outer end of the axle-nut B.

Between the nut and ring E is interposed a volute wire spring, H, of conical form, which holds the ring E pressed against the end of the journal-box A, but yields to the thrust which naturally results from the motion of the vehicle. When the thrust has sufficient force the spring H is pressed flat between the opposing parallel surfaces. An elastic and anti-friction bearing, of substantially similar construction, is applied at the inner end of the axle-journal, as shown in Figs. 1, 2, and the parts thereof are indicated by the same letters primed. Such end bearings serve to relieve the shocks incident to use of the ordinary journal-bearing, and thereby contribute very materially to the easy motion and durability of the vehicle. These end bearings and the intermediate or main bearings of the journal co-operate in reducing friction to a minimum, and hence constitute a very desirable improvement in vehicles.

What I claim as new is—

1. The combination, with the axle-box C, having interior parallel circular grooves, of the tubes D, inserted in the latter, for receiving friction-balls, as shown and described.

2. The combination, with the axle journal and box and a nut or shoulder on the former, of the elastic and anti-friction end bearing composed of a series of balls, a suitably-grooved annulus for holding the balls, and a spring interposed between such annulus and shoulder, as shown and described.

JACOB GRIGG TITUS.

Witnesses:
A. M. MCELHINNEY,
A. W. BLACKMER.